US010876042B2

(12) United States Patent
Qu et al.

(10) Patent No.: US 10,876,042 B2
(45) Date of Patent: Dec. 29, 2020

(54) IN SITU FORMED INORGANIC SOLIDS IN FRACTURE NETWORKS (71) Applicant: SCHLUMBERGER TECHNOLOGY CORPORATION, Sugar Land, TX (US)

(72) Inventors: Meng Qu, Waltham, MA (US); Francois M. Auzerais, Boston, MA (US); Sandeep Verma, Acton, MA (US); Agathe Robisson, Cambridge, MA (US); Sharath Chandra Mahavadi, Lexington, MA (US); Yucun Lou, Belmont, MA (US); Shitong S. Zhu, Waban, MA (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 16/310,753

(22) PCT Filed: Jun. 15, 2017

(86) PCT No.: PCT/US2017/037584
§ 371 (c)(1),
(2) Date: Dec. 17, 2018

(87) PCT Pub. No.: WO2017/218720
PCT Pub. Date: Dec. 21, 2017

(65) Prior Publication Data
US 2019/0264095 A1    Aug. 29, 2019

Related U.S. Application Data (60) Provisional application No. 62/351,626, filed on Jun. 17, 2016.

(51) Int. Cl.
C09K 8/60    (2006.01)
C09K 8/70    (2006.01)
(Continued)

(52) U.S. Cl.
CPC ............ *C09K 8/665* (2013.01); *C09K 8/40* (2013.01); *C09K 8/50* (2013.01); *C09K 8/518* (2013.01);
(Continued)

(58) Field of Classification Search
CPC . C09K 8/80; C09K 8/70; C09K 8/516; C09K 8/805
See application file for complete search history.

(56) References Cited

U.S. PATENT DOCUMENTS 4,982,786 A    1/1991    Jennings, Jr.
6,228,812 B1   5/2001    Dawson et al.
(Continued)

FOREIGN PATENT DOCUMENTS

WO    2012170522 A2    12/2012
WO    2015026369 A1    2/2015

OTHER PUBLICATIONS

Aldosari, M. A. et al., "Synthesis and Characterization of the in Situ Bulk Polymerization of PMMA Containing Graphene Sheets Using Microwave Irradiation", Molecules, 2013, 18, pp. 3152-3167.
(Continued)

*Primary Examiner* — Zakiya W Bates
(74) *Attorney, Agent, or Firm* — Trevor G. Grove (57) ABSTRACT Methods of treating a subterranean formation penetrated by a wellbore may include injecting a multistage fracturing treatment into the wellbore comprising one or more stages of geopolymer precursor composition containing a geopolymer precursor and an activator, and one or more stages of a spacer fluid; and curing the one or more stages of geopolymer precursor composition. In another aspect, methods of treating a subterranean formation penetrated by a wellbore may include injecting a multistage fracturing treatment into the wellbore that include one or more stages of geopolymer
(Continued)

precursor composition, wherein the geopolymer precursor composition includes an emulsion having an oleaginous external phase, and an internal phase comprising one or more surfactants, a geopolymer precursor, and an activator, and one or more stages of a spacer fluid; and curing the one or more stages of geopolymer precursor composition.

20 Claims, 8 Drawing Sheets

(51) Int. Cl.
| | |
|---|---|
| E21B 33/138 | (2006.01) |
| E21B 43/26 | (2006.01) |
| E21B 43/22 | (2006.01) |
| C09K 8/66 | (2006.01) |
| E21B 43/267 | (2006.01) |
| C09K 8/40 | (2006.01) |
| C09K 8/50 | (2006.01) |
| C09K 8/518 | (2006.01) |

(52) U.S. Cl.
 CPC .............. *C09K 8/601* (2013.01); *C09K 8/703* (2013.01); *E21B 33/138* (2013.01); *E21B 43/26* (2013.01); *E21B 43/267* (2013.01); *C09K 2208/08* (2013.01)

(56) References Cited

U.S. PATENT DOCUMENTS

| | | |
|---|---|---|
| 6,776,235 B1 | 8/2004 | England |
| 10,100,245 B1 | 10/2018 | Bulekbay et al. |
| 2006/0048943 A1 | 3/2006 | Parker et al. |
| 2006/0048944 A1 | 3/2006 | van Batenburg et al. |
| 2008/0028994 A1 | 2/2008 | Barlet-Gouedard et al. |
| 2008/0196896 A1 | 8/2008 | Bustos et al. |
| 2011/0186293 A1 | 8/2011 | Gurmen et al. |
| 2012/0129737 A1 | 5/2012 | Lesko et al. |
| 2012/0267111 A1 | 10/2012 | Khlestkin |
| 2013/0146292 A1 | 6/2013 | Litvinets et al. |
| 2014/0020893 A1* | 1/2014 | Smith ...................... C09K 8/62 166/280.2 |
| 2014/0060831 A1 | 3/2014 | Miller |
| 2014/0083702 A1 | 3/2014 | Godfrey et al. |
| 2014/0131041 A1 | 5/2014 | Liang et al. |
| 2014/0144634 A1 | 5/2014 | Nguyen et al. |
| 2014/0290943 A1 | 10/2014 | Ladva et al. |
| 2014/0374095 A1 | 12/2014 | Ladva et al. |
| 2015/0107835 A1 | 4/2015 | Panga et al. |
| 2015/0167443 A1 | 6/2015 | Litvinets et al. |
| 2016/0130499 A1 | 5/2016 | Nguyen |
| 2016/0153274 A1* | 6/2016 | Hull ...................... E21B 43/267 166/280.2 |
| 2017/0002623 A1 | 1/2017 | Lecerf et al. |
| 2017/0101572 A1 | 4/2017 | Qu et al. |
| 2017/0218259 A1 | 8/2017 | Fujii et al. |
| 2018/0134948 A1 | 5/2018 | Chopade et al. |
| 2018/0298271 A1 | 10/2018 | Auzerais et al. |

OTHER PUBLICATIONS

Aubry, J. et al., "Nanoprecipitation of Polymethylmethacrylate by Solvent Shifting: 1. Boundaries", Langmuir, 2009, 24(4), pp. 1970-1979.
Chen W. et al., "In situ synthesis of poly(methyl methacrylate)/MgAl layered double hydroxide nanocomposite with high transparency and enhanced thermal properties", Solid State Communications, 2004, 130, pp. 259-263.
Chindaprasirt, P. et al., "Workability and strength of coarse high calcium fly ash geopolymer", Cement and Concrete Composites, 2007, 29(3), pp. 224-229.
Colangelo, F. et al., "Preparation and Characterization of New Geopolymer-Epoxy Resin Hybrid Mortars", Materials, 2013, 6, pp. 2989-3006.
Cole, R. C., "Epoxy Sealant for Combating Well Corrosion", SPE 7874, SPE Oilfield and Geothermal Chemistry Symposium, Houston, Texas, U.S.A., 1979, 11 pages.
Dewprashad, B. et al., "A Method to Select Resin-Coated Proppants", SPE 26523, SPE Annual Technical Conference and Exhibition, Houston, Texas, U.S.A., 1993, pp. 177-184.
Dewprashad, B. et al., "Epoxy Resin Consolidation System Improves Worker Safety, Chemical Compatibility, and Performance", SPE 38189, SPE European Formation Damage Conference, The Hague, Netherlands, 1997, pp. 437-444.
Favier, A. et al., "Flow properties of MK-based geopolymer pastes", Soft Matter, 2014,10(8), pp. 1134-1141.
Fernandez-Jimenez, A. et al., "Alkaline activation of metakaolin-fly ash mixtures: Obtain of Zeoceramics and Zeocements", Microporous and Mesoporous Materials, 2008, 108(1-3), pp. 41-49.
Grubbs, R. H.. et al., "Living Ring-Opening Olefin Metathesis Polymerization" in Polymer Science: A Comprehensive Reference, 2012, vol. 4, pp. 21-29.
Hamerton, I. et al., "Metals and coordination compounds as modifiers for epoxy resins", Coordination Chemistry Reviews, 2002, 224, pp. 67-85.
Kamhangrittirong, P. et al., "Synthesis and Properties of High Calcium Fly Ash Based Geopolymer for Concrete Applications", 36th Conference on Our World in Concrete and Structures, Singapore, 2011, 9 pages.
Li, X. et al., "Mechanical Properties and Microstructure of Class C Fly Ash-Based Geopolymer Paste and Mortar", Materials, 2013, 6, pp. 1485-1495.
Malik, Q. M. et al., "CO2 Injection in the Weyburn Field of Canada: Optimization of Enhanced Oil Recovery and Greenhouse Gas Storage With Horizontal Wells", SPE 59327, presented at the SPE/DOE Improved Oil Recovery Symposium, Tulsa, Oklahoma, U.S.A., 2000, 16 pages.
Montes, C. et al., "Influence of Activator Solution Formulation on Fresh and Hardened Properties of Low-Calcium Fly Ash Geopolymer Concrete", Coal Combustion and Gasification Products, 2012, 4, 9 pages.
Ng, R. C. et al., "Coiled Tubing Resin Squeeze to Mitigate Water Production in Offshore Gravelpack Wells", SPE 38836, SPE Annual Technical Conference and Exhibition, San Antonio, Texas, U.S.A., pp. 869-881, undated.
Peng, F.. et al., "Polybutadiene Grafting and Crosslinking in High-Impact Polystyrene Bulk Thermal Process", Journal of Applied Polymer Science, 1990, 40, pp. 1289-1302.
Petermann, J. C. et al., "Alkali-activated geopolymers: a literature review", Air Force Research Laboratory Materials and Manufacturing Directorate, 2010, 99 pages.
Saunders, L. W. et al., "Performance Review of Phenolic-Resin Gravel Packing", SPE 8425, Journal of Petroleum Technology, 1981, 33(2), pp. 221-228.
Singh, B. et al., "Geopolymer concrete: A review of some recent developments", Construction and Building Materials, 2015, 85, pp. 78-90.
Soriano-Corral, F. et al., "Synthesis and Characterization of High Impact Polystyrene from a Heterogeneous Styrene-Rubber-Polystyrene Solution: Influence of PS Concentration on the Phase Inversion, Morphology and Impact Strength"., Macromolecular Symposia, 2013, 325-326, pp. 177-183.
Traubel, H. , "Precipitation of Polymers in Water-Based Dispersions" in New Materials Permeable to Water Vapour, 1999, Springer, 14 pages.
Wheeler, R. S., "A Study of High-Quality Foamed Fracturing Fluid Properties", CSUG/SPE 137761, Canadian Unconventional Resources and International Petroleum Conference, Calgary, Alberta, Canada, 2010, pp. 18 pages.
Yew, C. H., "Mechanics of Hydraulic Fracturing", Gulf Publishing Company, 1997, Houston, Texas, USA, p. 167.

(56) References Cited

OTHER PUBLICATIONS

Search Report and Written Opinion of International Patent Application No. PCT/US2016/043976 dated Oct. 21, 2016, 9 pages.

* cited by examiner

IN SITU FORMED INORGANIC SOLIDS IN FRACTURE NETWORKS

CROSS-REFERENCE TO RELATED APPLICATIONS

The present application claims priority from U.S. Provisional Appl. No. 62/351,626, filed on Jun. 17, 2016, entitled "In Situ formed inorganic solids in fracture networks," herein incorporated by reference in its entirety.

BACKGROUND

Fracturing operations conducted in a subterranean formation may enhance the production of fluids by injecting pressurized fluids into the wellbore to induce hydraulic fractures and flow channels connecting isolated reservoirs. Fracturing fluids may deliver various chemical additives and proppant particulates into the formation during fracture extension. Following the injection of fracture fluids, proppants injected into the fractures prevent closure as applied pressure decreases below the formation fracture pressure. The propped open fractures then allow fluids to flow from the formation through the proppant pack to the production wellbore.

The success of the fracturing treatment may depend on the ability of fluids to flow from the formation through the proppant pack installed after initiating the fracture. Particularly, increasing the permeability of the proppant pack relative to the formation may decrease resistance to the flow of connate fluids into the wellbore. Further, it may be desirable to minimize the damage to the surface regions of the fracture to maximize connected porosity and fluid permeability for optimal flow from the formation into the fracture.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments of the present disclosure are directed to methods of treating a subterranean formation penetrated by a wellbore, which include injecting a multistage fracturing treatment into the wellbore comprising one or more stages of geopolymer precursor composition containing a geopolymer precursor and an activator, and one or more stages of a spacer fluid; and curing the one or more stages of geopolymer precursor composition.

In another aspect, embodiments of the present disclosure are directed to methods of treating a subterranean formation penetrated by a wellbore that include injecting a multistage fracturing treatment into the wellbore that include one or more stages of geopolymer precursor composition, wherein the geopolymer precursor composition contains an emulsion having an oleaginous external phase, and an internal phase comprising one or more surfactants, a geopolymer precursor, and an activator, and one or more stages of a spacer fluid; and curing the one or more stages of geopolymer precursor composition.

Other aspects and advantages of the invention will be apparent from the following description and the appended claims.

DETAILED DESCRIPTION

The particulars shown herein are by way of example and for purposes of illustrative discussion of the examples of the subject disclosure only and are presented in the cause of providing what is believed to be the most useful and readily understood description of the principles and conceptual aspects of the subject disclosure. In this regard, no attempt is made to show structural details in more detail than is necessary, the description taken with the drawings making apparent to those skilled in the art how the several forms of the subject disclosure may be embodied in practice. Furthermore, like reference numbers and designations in the various drawings indicate like elements.

Embodiments of the present disclosure are directed to the use of geopolymer precursor compositions capable of producing geopolymers having controlled mechanical properties and densities. Geopolymer precursor compositions may be incorporated into wellbore treatments and fracturing operations as additives that solidify in situ to prop open natural and existing fractures and/or function as fluid loss control materials. Geopolymer precursor compositions in accordance with the present disclosure may be emplaced within a formation as a component of a multistage fracturing fluid that generates geopolymer clusters or "pillars"—load-bearing support structures 13 that stabilize fractures within a given formation. Methods in accordance with the present disclosure may include creating and improving fracture conductivity using geopolymer precursor compositions that cure in situ during fracturing operations. Geopolymer precursor compositions may be formulated as a fluid, emulsion, foam, or slurry in some embodiments, and may be used in conjunction with a number of additives. For example, geopolymer precursor compositions may include additives to reinforce the final pillars and/or inhibit settling of the geopolymer precursor composition during emplacement in a fracture.

Hydraulic fracturing involves pumping fluid into a well faster than the fluid can escape into the formation, which increases pressure against the formation walls until the formation breaks. When the breakdown of the formation occurs, fracture growth exposes new formation area to the injected fluid and continued pumping may be required to compensate for fracturing fluids that enter the formation to propagate and grow fractures. During this process, fractures are held open by hydraulic pressure and proppants may be added to hold fractures open after the cessation of pumping and to maintain conductive flow paths during production. During the initial stages of a fracturing operation, a pad fluid may be injected to break down the wellbore, initiate the fracture and produce sufficient penetration and width to allow proppant-laden stages to later enter the fracture after the pad is pumped.

In one or more embodiments, geopolymer precursor compositions may be used as a component of a wellbore treatment to modify fluid conductivity in formation fractures, and to treat regions of the formation where finer fractures may render delivery of proppants more difficult. When emplaced, geopolymer precursor compositions cure to form solid pillars or agglomeration of particles that support fracture networks in the near wellbore area and in the formation. In some embodiments, geopolymer precursor compositions may be employed at any stage of a fracturing process, including fracturing in early or late initiation periods, in sequential or incremental fracturation, and may treat all types of formation fractures such as natural, pre-existing, and hydraulically-induced fractures. Geopolymer precursor compositions in accordance with the present disclosure may resist losing or partially losing volume attributed to surface adsorption during treatment and may be applied to unconventional reservoirs, such as shales and fractured reservoirs, and with any reservoir rock type, including carbonates, sandstone, limestone, and/or chalk.

Geopolymer precursor compositions in accordance with the present disclosure may be prepared in a variety of formulations and reacted using different chemical routes to create the pillars in situ under downhole conditions. In some embodiments, variables such as injection time and pumping speed may be used to tune the size of the pillars generated within formation fractures and, in turn, the fluid conductivity of a fracture network. Geopolymer precursor compositions in accordance with the present disclosure may be emplaced within one or more regions of a wellbore, such as during sequential fracturing operations within different intervals of the wellbore including operations within deviated and horizontal wells.

Methods in accordance with the present disclosure may be used in the creation of staged fractures along a wellbore. In one or more embodiments, fracturing methods may include initiating formation fracturing by injecting a fluid into the wellbore at a pressure equal to or greater than the fracture initiation pressure of the formation, followed by the injection of a multistage treatment that may include one or more stages of a geopolymer precursor composition and one or more stages of a spacer fluid. Injection of the stages of the multistage treatment fluid may be performed separately and/or simultaneously. In some embodiments, the spacer fluid may contain a filler material that is removed to form open channels around pillars of cured geopolymer that permit fluids to flow through the fracture and toward the wellbore.

Figure 1:
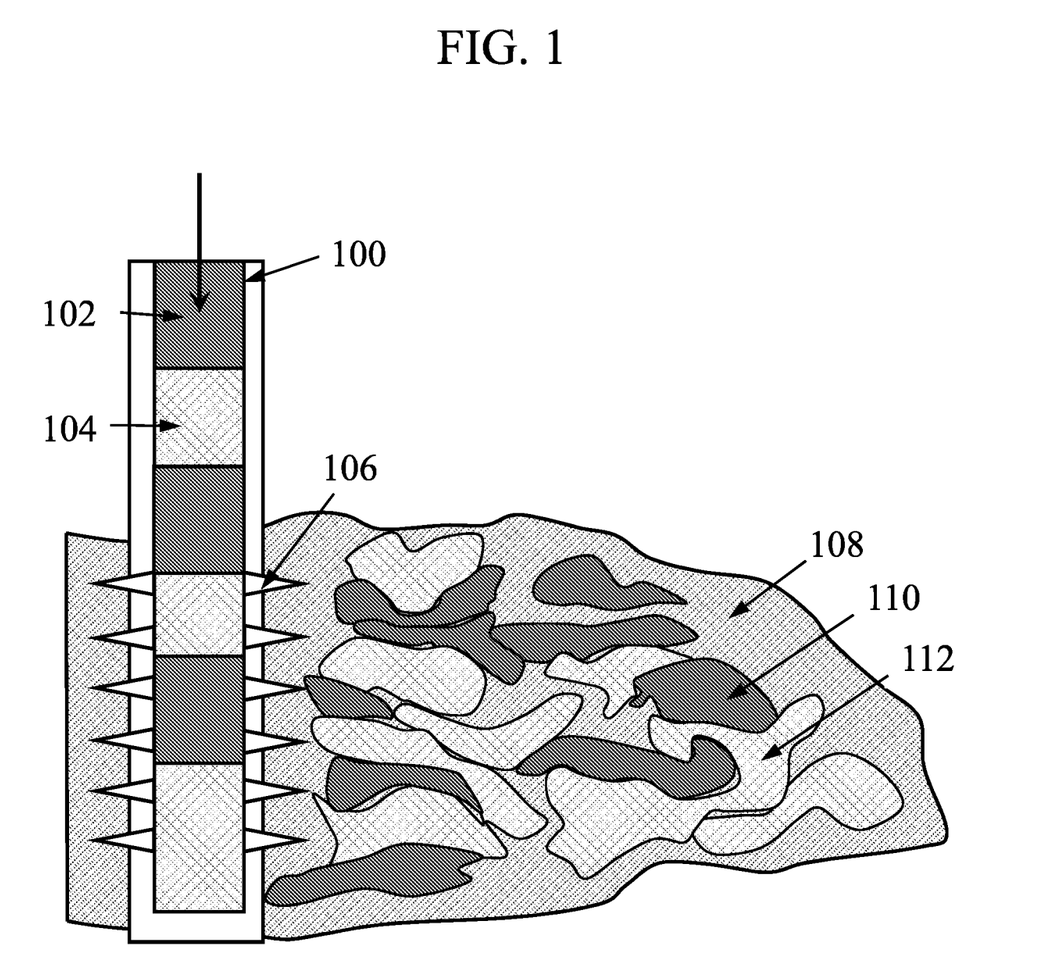
FIG. 1 is an illustration of a treatment fluid being injected into a wellbore interval in accordance with embodiments of the present disclosure.
Figure 2:
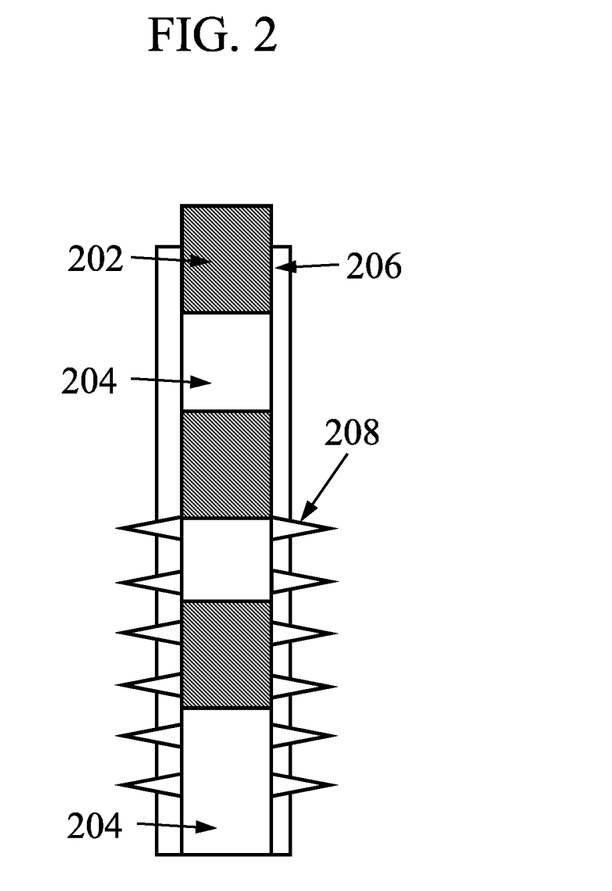
FIG. 2 is an illustration of the delivery of a treatment fluid pumping sequence into a fractured wellbore interval in accordance with embodiments of the present disclosure.

FIGS. 1 and 2 depict embodiments of placement methods for treatment fluids in accordance with the present disclosure into a formation. In some embodiments, treatment fluids may be administered by alternating the injection of fracturing fluids containing geopolymer precursor compositions and spacer fluids to create support pillars within wellbore and formation fractures that increase permeability of the fractures to connate fluids following fracturing operations.

With particular respect to FIG. 1, a method of placement of the injection fluid is depicted in which a well treatment fluid is injected in stages that alternate between geopolymer precursor compositions 102 and a spacer fluid 104 through a wellbore 100 through fractures 106 and into the formation 108. Following emplacement, the geopolymer precursor composition 102 of the treatment fluid may form pillars 110 in formation fractures 108 with interspersed channels that increase the permeability of the formation to fluid flow.

Spacer fluids 104 in accordance with the present disclosure may include a number of additives, such as filler materials, that maintain separation between the geopolymer precursor composition stages during emplacement, and later dislodge, dissolve, or otherwise are removed to generate flow channels between pillars produced by the cured geopolymer precursor composition. During emplacement into the formation, geopolymer precursor compositions 102 and spacer fluid 104 containing a filler material are introduced within a fracture in such a way that the spacer fluid is segregated from the geopolymer precursors, creating clusters or islands of geopolymer precursor composition that cure to form solid pillars to hold open the fracture. Following the cure of the geopolymer pillars, the remaining filler material may be removed to form open channels around the geopolymer pillars for unimpeded fluid flow through the formation. Removal of filler material may be influenced by such factors as invasion of formation fluids, hydrolysis, downhole temperatures, incipient or delayed degradation agents in the filler material, introduction of an activating fluid that degrades the filler material, and the like, or any combination thereof.

In one or more embodiments, the spacer fluids 104 may be formulated to exhibit density and viscosity similar to that of the geopolymer precursor composition 102, such that the multistage fluid may be transported into the wellbore with limited dispersion, fingering, or interface instability between stages. In some embodiments, the variation in density and viscosity may also be accounted for by combining one or both stages with filler materials such as solids and/or surfactants that modify the rheology of the treated stage. For example, a polymeric or viscoelastic rheology modifier may be added to the spacer fluid and/or the geopolymer precursor composition to control fluid loss and leak off of fluid treatments into the formation, which may be formulated for a given formation by considering fracture network geometry such as width, height, length, and branchedness, to remedy fluid loss. In another example, the spacer stage of a multistage treatment may be modified to include a degradable fiber to enhance transport properties of the treatment fluid and to provide resistance to mixing at the interface between the spacer stages and the stages containing geopolymer precursor composition.

In one or more embodiments, there may be no fluid interface stability issues during pumping, and the spacer fluid 104 may be a standard fracturing fluid. With particular respect to FIG. 2, the geopolymer precursor composition 202 and spacer fluid 204 may have compatible density and viscosity profiles, and the spacer fluid may be introduced without filler materials. The fracturing fluid 204 and geopolymer precursor compositions 202 may then be introduced into the formation sequentially as part of a multistage wellbore treatment.

In one or more embodiments, the spacer fluid (104, 204) and/or the base fluid of the geopolymer precursor composition (102, 202) may be aqueous, oleaginous, an invert or direct emulsion, or a foam having a gaseous internal phase such as nitrogen, carbon dioxide, or natural gas. Foamed treatments may possess high viscosity compared to the base liquid, fluid loss comparable to that of crosslinked fluids in low matrix permeability, and excellent solid transport capability. Geopolymer precursor compositions formulated as foams remain compatible with the cluster chemistry responsible for the creation of solid pillars, and may enable a more rapid and more complete return of the treating fluid. Foam treatments may also be useful in low pressure reservoirs and in depleted zones. Foam formulations of geopolymer precursor compositions may also minimize the dilution of activators with connate and added aqueous fluids, may enhance production, and may reduce operational water consumption. In some embodiments, geopolymer precursor compositions may be combined with the conventional crosslinked fluids or used in conjunction with slickwater approaches.

Figure 3:
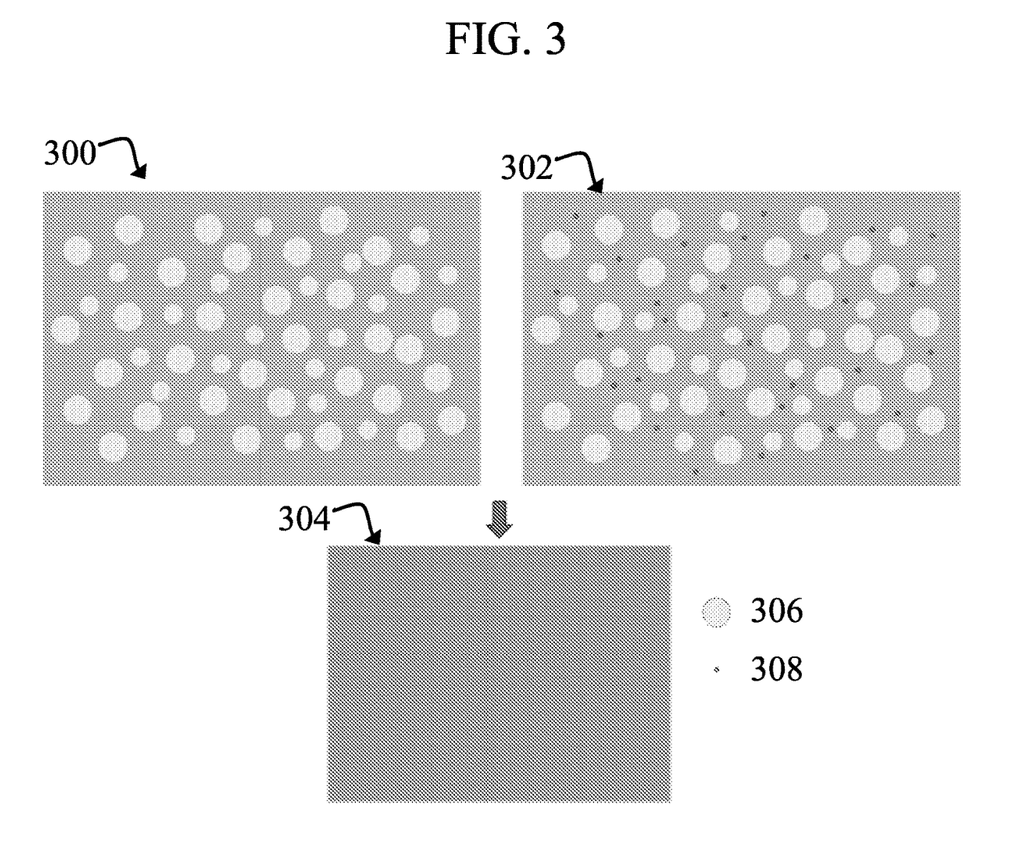
FIG. 3 is an illustration depicting various reaction pathways to generate solid pillars in accordance with embodiments of the present disclosure.

In one or more embodiments, geopolymer pillars may be formed in situ downhole through chemical reaction processes. With particular respect to FIG. 3, two possible reaction pathways for geopolymer precursor compositions 300 and 302 are shown to form cured geopolymer 304. In the first example 300, the geopolymer precursor composition 306 is suspended as a slurry or emulsion in a base fluid that is emplaced within the formation. Once emplaced, an activator component in the geopolymer precursor composition initiates the polymerization of the geopolymer, generating the cured solid in 304. In the second example 302, the geopolymer precursor composition 306 is formulated without the activator and suspended in a base fluid. The activator is encapsulated 308 and added as another component of the base fluid. Upon emplacement of the treatment 302, the activator is released from the encapsulant by an appropriate stimulus such as physical disruption, heat, pH change, and the like, and the activator then initiates polymerization to yield cured geopolymer 304.

Figure 4:
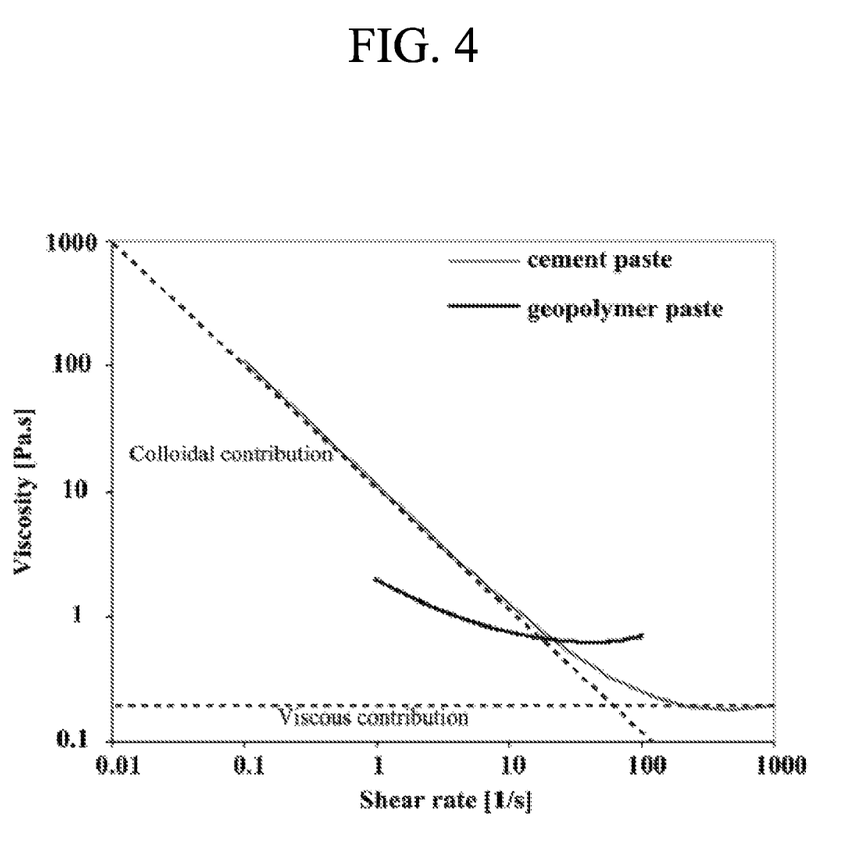
FIG. 4 is a graphical representation showing apparent viscosity as a function of shear rate for samples in accordance with embodiments of the present disclosure.

Geopolymer compositions may be formulated to have similar rheology and functionality to cement slurries. With particular respect to FIG. 4, the viscosity as a function of shear rate for an embodiment of a geopolymer precursor composition is compared to a representative cement slurry, and performance between the samples is shown to be within a similar regime. Rheology of geopolymer precursor compositions and treatment fluids in accordance with the present disclosure may be modified by tuning the solid volume fraction (water to solid ratio) and the addition of chemicals such as dispersants, plasticizers and superplasticizers (polycarboxylates, polycarboxylate ethers, lignin-based plasticizers hydroxyls, sulphate ions, citrates, and the like). The performance of treatment fluids by the addition of these dispersants/plasticizers may also reduce yield stress and retard hydration.

Figure 5:
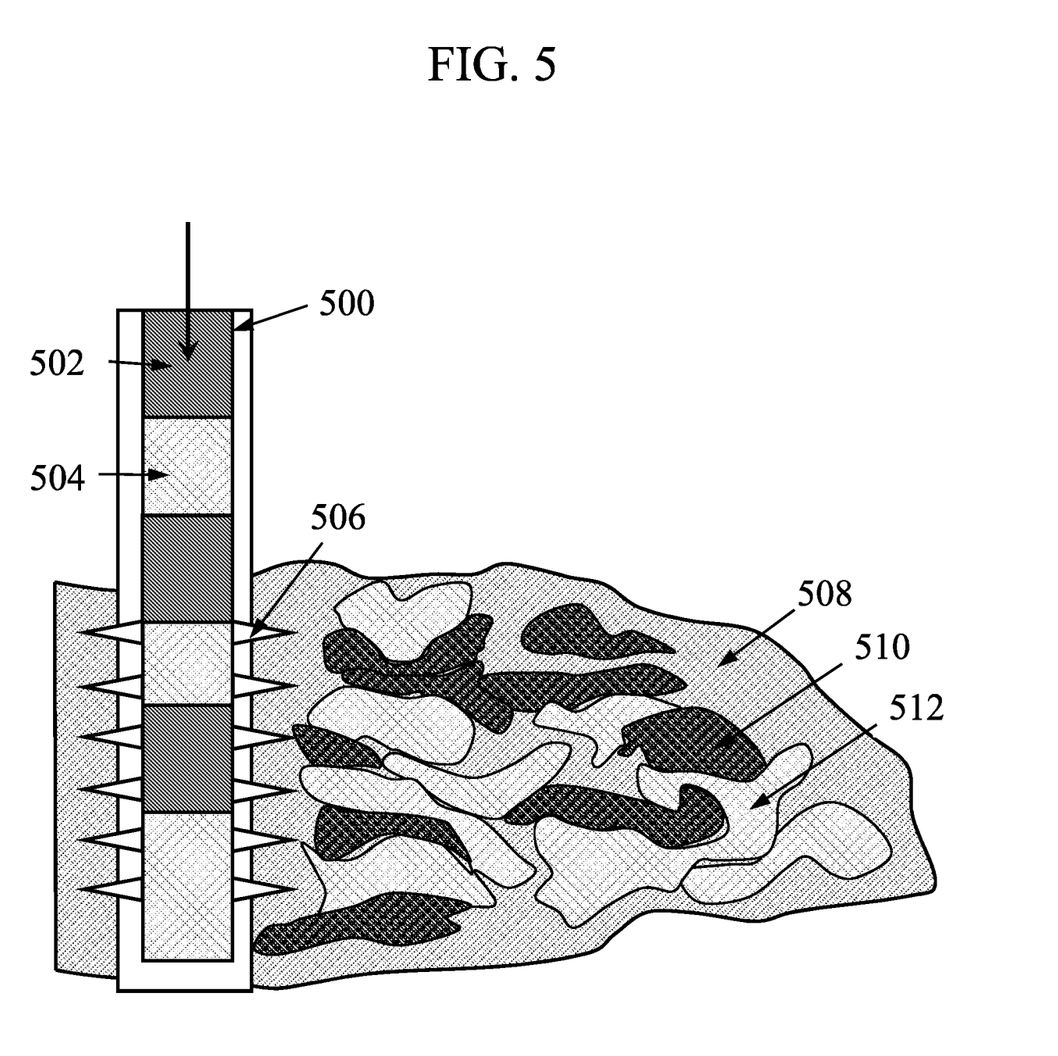
FIG. 5 is an illustration of the formation of inorganic pillars in a fractured interval in accordance with embodiments of the present disclosure.

In FIG. 5, the chemical reaction may lead to the formation of clusters 510, which is an assembly of reacted large solid pieces that are larger than the pore size in the treater interval. FIG. 5 shows a snapshot of the evolution of the chemical reaction within the fracture for in-situ formed solid clusters 510. The geopolymer precursor with activator and other additives 502 will be sequentially pumped down with a spacer fluid 504. The mixture of the chemicals will form solid pillars to keep the fracture tip open 510, while filter materials 512 may be removed/broken/degraded to form open channels.

Figure 6:
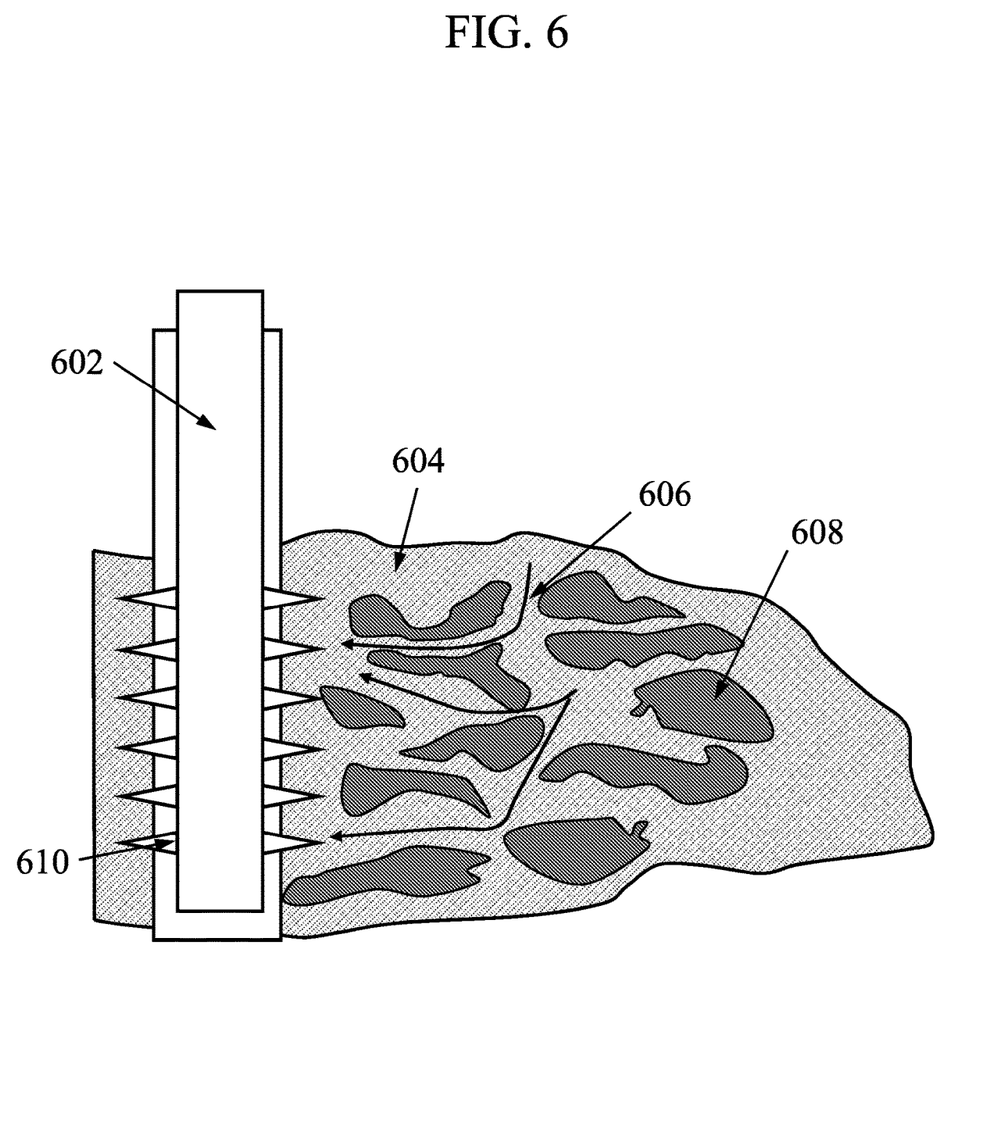
FIG. 6 is an illustration depicting the flow of fluids around pillars generated in accordance with embodiments of the present disclosure.

Once the in situ chemical reaction and removal of fillers is complete, where fillers are present, a single phase solid block acts as supporting pillars in the fracture network far from the near wellbore area. These pillars can hold certain loads and keep the fractures open to allow reservoir production from the fracture network created as a whole, including the fracture initiation period as shown in FIG. 6. The formation of pillars as a result of in situ formation of the geopolymer solid pillars in the fracture is shown in FIG. 6. Once the chemical reaction is complete, it forms solid pillars 608. During emplacement, spacer fluid stages between the geopolymer precursor composition stages produce open channels 606 around the pillars 608 for fluid flow from the formation 604 through near wellbore fractures 610 and toward the wellbore 602. In embodiments in which the spacer fluid contains a degradable material, channels 606 may be generated by removing, breaking, or otherwise degrading of filler material between the geopolymer pillars.

In one or more embodiments, methods in accordance with the present disclosure may involve creating staged fractures along a wellbore by injecting pressurized treatment fluids to initiate fractures in the formation. In some embodiments, a fracture fluid pad may be followed by injecting a multistage treatment fluid having one or more stages that contain a geopolymer precursor composition partitioned by stages of a spacer fluid. However, depending on the properties of the treatment fluid, fracture fluid pads may be omitted in some embodiments and a single stage or multistage treatment fluid may be used directly to generate sufficient hydraulic fracture width and provide better fluid loss control.

Multistage treatment fluids in accordance with the present disclosure may contain a predetermined sequence of stages of fluid volumes, including one or more stages of a geopolymer precursor composition that creates a series of pillars that function to prop open fractures and provide regions of increased permeability through the hydraulically fractured network. When employed during fracturing operations, geopolymer precursor composition may be emplaced within an interval of a wellbore during fracture initiation, enter into the fractures, and aggregate to generate support structures that prop open the fractures without damaging the overall fracture network. In some embodiments, geopolymer precursor compositions may be selected such that the formation of the geopolymer occurs before the fracture closure stress seals opened fractures. Geopolymer pillars may then hold existing and newly formed fractures open, while eliminating or minimizing uncontrolled propagation of fractures from the wellbore. Moreover, during production, geopolymer pillars generated may hold fractures open at discrete locations while reservoir fluids are transported through open channels and voids between the pillars.

In one or more embodiments, methods in accordance with the present disclosure may include emplacing a multistage treatment fluid containing fluid stages of geopolymer precursor composition in combination with spacer fluid stages that function to separate the geopolymer precursor composition stages. In some embodiments, spacer fluid stages may also contain various additives such as degradable solids and fillers that may be removed following emplacement and curing of the polymer-containing components of the treatment fluid. For example, following the injection of a multistage treatment fluid, degradable filler materials used to partition the polymeric proppant pillars may degrade upon exposure to formation temperatures or aqueous connate fluids or be removed by the injection of aqueous fluids, solvents or degrading agent such as an acid, base, enzyme, or oxidizer.

Following emplacement of geopolymer precursor composition and the generation of pillars, induced and natural fractures may be propped open, increasing formation permeability. With particular respect to FIG. 6, voids and channels 606 are created around the solid pillars 608 within the formation fracture 604. Connate fluids such as hydrocarbons are then allowed to flow into the wellbore 602 through perforations 610.

In one or more embodiments, one or more geopolymer precursor composition stages of a multistage treatment may be multiphasic. For example, one or more geopolymer precursor composition stages may be formulated as an emulsion in which the reactants are isolated in distinct internal phases to prevent premature reaction before emplacement. In some embodiments, a first surfactant may be used to suspend a geopolymer precursor in a first internal phase of an emulsion, while a second surfactant is used to suspend an activator in a second internal phase of the emulsion. The geopolymer precursor composition containing multiple internal phases may then be transported into the target zone without reacting the individual components. The reaction to form a geopolymer is then initiated by mixing the internal phases, which may be done by disrupting the interaction of the surfactant at the surface of the micelle through an appropriate mechanism such as heat, physical disruption, or pH change. In one or more embodiments, surfactants may be modified to create distinct internal phases by modifying the properties of the surfactants, such as by selecting differing molecular weights or ranges, and/or introducing steric groups or ionic charge.

Figure 7:
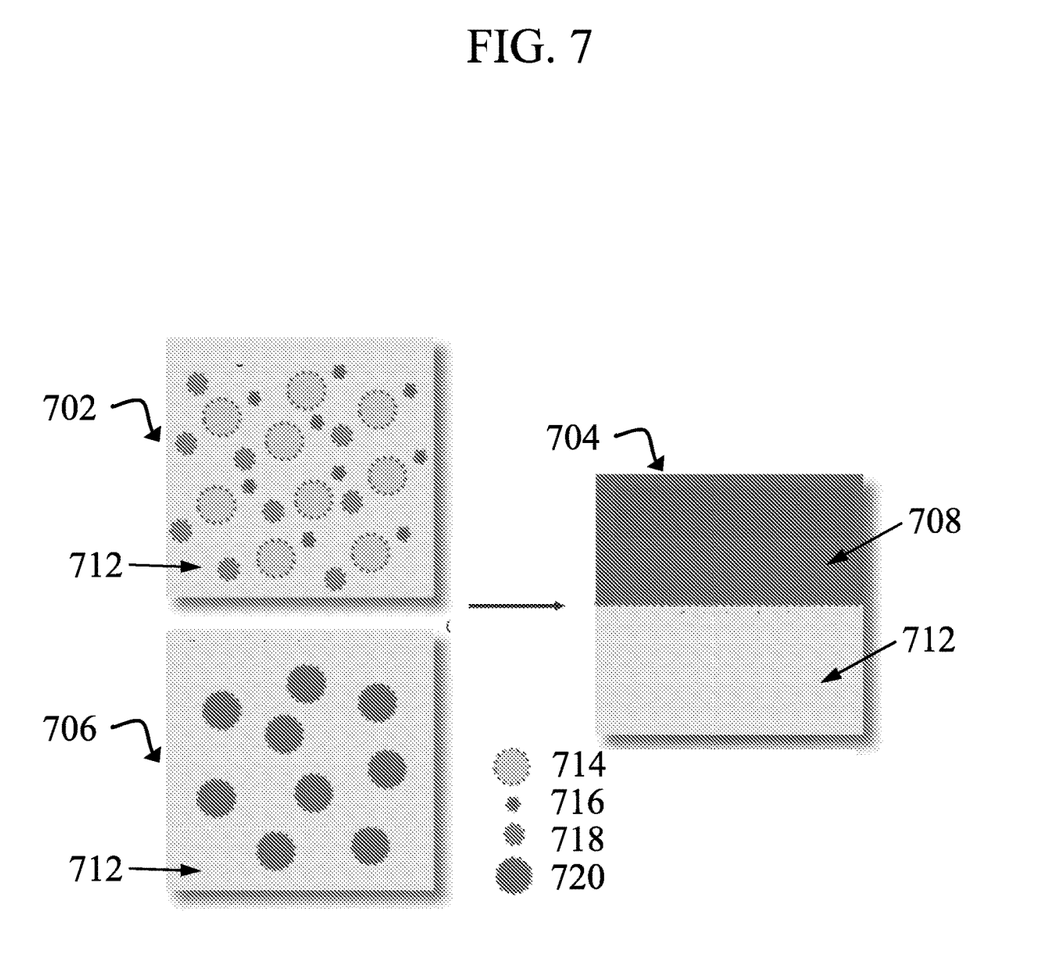
FIG. 7 is an illustration of emulsions containing geopolymer precursor composition in accordance with embodiments of the present disclosure.

With particular respect to FIG. 7, two exemplary embodiments of geopolymer precursor compositions 702 and 706 are shown. In the first example 702, multiple surfactants are used to partition various components of the geopolymer precursor composition into distinct phases. In this example, the external phase 712 is an oil or organic solvent, and unique surfactants are used to partition a hydrophilic geopolymer precursor 714, activator 716, and water 718 into distinct internal phases. The components of the geopolymer precursor composition remain isolated from one another during transport and emplacement within a fractured formation. Following emplacement, surfactants are disrupted by a suitable trigger such as temperature or pH change, which leads to the coalescence of the geopolymer precursor composition components from the internal phase and subsequent cure of the geopolymer.

In the second example, the geopolymer precursor, activator, and water 720 are mixed in the internal phase within the oil or organic solvent 712 external phase. When emulsified, the geopolymer precursor composition in the internal phase is prevented from aggregating and forming larger particles and undergoes limited reaction prior to emplacement. Once emplaced within a fracture, the surfactant is disrupted and the internal phase containing the geopolymer precursor material is allowed to coalesce and cure to form the final geopolymer. While two embodiments are shown in FIG. 7, other variations are possible and within the scope of this disclosure.

In one or more embodiments, treatment fluid stages may vary in volume from one operation to another. For example, the size of the proppant pillars and the spacing between may be tunable by changing the pumping schedule of the pulse pumping strategy, including changing the volume of injected fluid for each of the stages in the multistage treatment. For example, with a shorter geopolymer precursor composition pumping interval smaller pillars are obtained. The spacing between pillars can also be controlled by the pumping strategy. In addition, the formation and the strength of the solid pillars can be tuned by tuning the chemical composition of the geopolymer precursor composition, the liquid-solid ratio, the curing conditions such as curing temperature and time, the particle size distribution of the geopolymer precursor, as well as the composition and ratio of the alkaline activators. In one or more embodiments, the compressive strength of geopolymer solid may range from MPa to 100 MPa.

Figure 8:
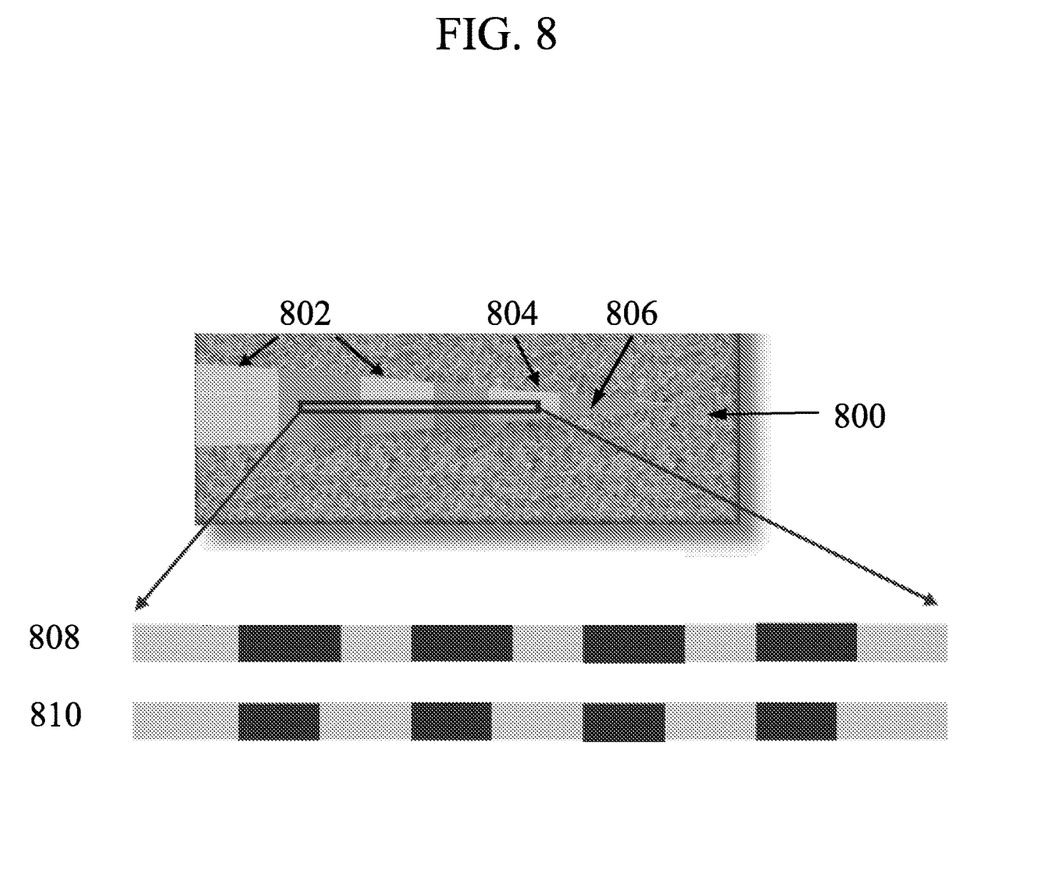
FIG. 8 is an illustration showing the formation of polymeric pillars for various pumping regimes in accordance in accordance with embodiments of the present disclosure.

With particular respect to FIG. 8, an example of a pulse pumped fluid treatment in accordance with the present disclosure is shown. A fracture 804 in a formation 800 contains an injected treatment fluid having alternating stages of geopolymer precursor composition 806 and spacer fluid 802. In some embodiments, control over the size of the geopolymer pillars may involve increasing the ratio of the geopolymer precursor composition fluid component with respect to the spacer fluid interval as shown in pumping schedule 808. Conversely, with a shorter pumping interval for the geopolymer precursor composition component, smaller pillars may be obtained. The spacing between pillars may also be controlled by adjusting the spacer fluid stages between the geopolymer precursor composition component stages in the pumping schedule as shown in 810. The volume of the geopolymer precursor composition stages may be adjusted with respect to the spacer fluid stages in some embodiments to suit various formation parameters such as porosity, elastic modulus, and the like. In some embodiments, the geopolymer precursor composition may be administered in a gated fashion, or switched on an off while the aqueous phase is continuously pumped.

The volume of the spacer fluid 802 and geopolymer-containing component 806 may vary with respect to each other and may change during the duration of the job. In one or more embodiments, the ratio of the volume of the geopolymer-containing component to spacer fluid may range from 1:0.1 to 0.1:1. In some embodiments, the ratio of the geopolymer-containing component to spacer may range from 1:0.5 to 0.5:1.

In some embodiments, one or more stages of geopolymer precursor composition and one or more stages of spacer fluid may be injected in volumes that range from 2 to 10 oilfield barrels (bbl). Treatment fluid stages may be injected in alternating fashion in sequence in which each stage is pumped for a duration that may range from 5 to 20 seconds, or from 10 to 15 seconds in some embodiments. Methods in accordance with the present disclosure may utilize injection rates that may range from 5 to 60 bbl/min in some embodiments, and from 10 to 50 bbl/min in some embodiments. The relative volume of the injected stages of geopolymer precursor composition and spacer fluid and the pulse pumping time in the pumping schedule may vary with respect to each other in some embodiments, and may change during the execution of a given operation.

The concentration of the geopolymer in a single-phase treatment fluid or in within one or more stages of a multistage treatment fluid may be in the range of 0.1 pounds per barrel (ppb) to 14 ppb in some embodiments, and from 0.5 ppb to 12 ppb in other embodiments.

Fracturing operations in accordance with the present disclosure may be used in combination with enhanced recovery techniques that improve fracture initiation such as acid spearheading and high viscosity pill injection, or such techniques may be modified to contain treatment fluid materials. In some embodiments, a spearheading treatment may be injected to remove formation damage or increase permeability prior to injection of treatment fluids in accordance with the present disclosure. Methods may also include pumping a tail-in fluid following treatment fluids in accordance with the present disclosure that may be designed to improve the near wellbore connectivity to one or more hydraulic fractures and prevent unintentional fracture pinchout at the wellbore. In some embodiments, tail-in fluids may include proppant and additional proppant flowback control additives such as resin coated proppant, geometrically diverse proppants such as rods or ellipsoids, particulates, fibers, and other solids.

Other potential applications in accordance with the present disclosure may include the use of diversion pills, such as commercially available BROADBAND™ sequence pills, to improve the wellbore coverage of treatment fluids in accordance with the present disclosure. In embodiments incorporating diversion pills, a diversion pill may be pumped after a treatment fluid containing a sequence of alternating pulses of treatment and spacer fluid to inhibit fracture growth in a selected location. For example, a diversion treatment may be applied to one particular perforation cluster to limit growth, while diverting subsequent treatments to other intervals and enabling fractures to initiate at a new perforation clusters previously surrounding by more permeable formation intervals.

Geopolymer Precursor

In one or more embodiments, geopolymer precursor compositions include geopolymer precursors such as aluminosilicates. Geopolymer precursors may be used as a solution, slurry, or suspension that polymerizes in alkaline conditions to form geopolymers. In one or more embodiments, geopolymer precursors include aluminosilicates such as metakaolin ($Al_2Si_2O_6$), kaolinite ($Al_2Si_2O_5(OH)_4$), mullite ($Al_6Si_2O_{13}$); feldspar such as albite ($NaAlSi_3O_8$), anorthite ($CaAl_2Si_2O_8$), microcline ($KAlSi_3O_8$), celsian ($BaAl_2Si_2O_8$), labradorite (Ca, Na)Al(Al, Si)$Si_2O_8$; and industrial solid residue particles including fly ash such as class C fly ash, class F fly ash, blast furnace slag, other metallurgical slag and mining residues containing aluminosilicates. Geopolymer precursors are available in fine particle form that may be dispersed in aqueous or oleaginous base fluids or direct and invert emulsions, alone or in combination with a suitable activator and other performance modifiers.

In one or more embodiments, geopolymer precursors in accordance with the present disclosure may be spherical, substantially spherical, disc-like, oblate, or rod-like in structure. In some embodiments, geopolymer precursors may possess a diameter (or length for proppants having an asymmetric aspect ratio) having a lower limit equal to or greater than 10 nm, 100 nm, 500 nm, 1 µm, 5 µm, 10 µm, 100 µm, and 500 µm, to an upper limit of 10 µm, 50 µm, 100 µm, 500 µm, 800 µm, and 1 mm, where the diameter (or length for proppants having an asymmetric aspect ratio) of the geopolymer precursor may range from any lower limit to any upper limit.

Activators

In one or more embodiments, curing of a geopolymer precursor to produce a solidified geopolymer having a suitable mechanical strength may occur in a controlled alkaline environment produced by an activator. Activators may be added to a geopolymer (in either solid or liquid form) or may be encapsulated by various chemistries in the mixture, to prevent premature reaction prior to emplacement within a fracture being treated.

In one or more embodiments geopolymer precursor compositions may include activators that initiate or modify the rate of geopolymer cure. Activators in accordance with the present disclosure include alkaline solids and solutions. Examples of activators include alkalis such as sodium hydroxide, potassium hydroxide, and calcium hydroxide; silicates such as sodium silicate, potassium silicate, and cerium silicate; weak salt acids such as sodium carbonate, sodium sulfite, sodium phosphate, potassium carbonate, potassium sulfite; strong salt acids such as sodium sulfate and potassium sulfate. The activator can be any one of these acticing agents or mixtures thereof Encapsulating Agents Activators in accordance with the present disclosure may be encapsulated to delay the reaction between the geopolymer precursor composition and the activator before the chemicals reach the fractures. In one or more embodiments, encapsulating agents may be organic or inorganic materials. Organic encapsulating agents in accordance with the present disclosure may include polymers that contain amide or urethane bonds such as polyethylene terephthalate, polyurethane, polyamide, and the like; epoxies, polyolefins, silicones, fluoropolymers, polyetherether ketones, polyimides, waxes, polyketones, and hybrid materials such as metal-based composites such as stainless steel/polymer composite coatings, zinc/rubber coatings, and the like. Inorganic encapsulating agents may include boron nitride, titanium nitride, chromium nitride, tungsten carbide, tungsten carbide/cobalt, tungsten carbide cobalt chrome, chrome carbide, and the like. Any of the above coatings may be used to encapsulate activators in accordance with the present disclosure, and the thickness of the coating may be tuned meet different releasing requirements. Release from the selected encapsulating agent may be achieved through pH change, temperature, diffusion through pores in the material, or physical disruption through fluid shear or comminution at the target interval depending on the chemistry of the encapsulating agent.

Surfactants

In one or more embodiments, geopolymer precursor composition stages may be formulated as an emulsion using an appropriate surfactant to delay the cure of the geopolymer precursor material. Geopolymer precursor compositions may be mixed with a surfactant to generate an internal phase in a suitable base fluid such as an oleaginous fluid, or individual components of a geopolymer precursor composition may be isolated in distinct internal phases to prevent premature reaction before emplacement. For example, a first surfactant may be used to suspend a geopolymer precursor in a first internal phase of an emulsion, while a second surfactant is used to suspend an activator in a second internal phase of the emulsion.

Surfactants for use in geopolymer precursor compositions in accordance with the present disclosure include ionic surfactants such as sodium dodecyl sulfate, sodium lauryl ether sulfate, alkyl sulfates, alkyl phenol ether sulfates, sulfonates such as sodium dodecylbenzene sulfonates, cationic surfactants such as benzalkonium chloride, dimethyldioctadecylammonium chloride, trimethylammonium bromides such as cetyl trimethylammonium bromide; hexyltrimethyl ammonium bromide, octyltrimethyl ammonium bromide, decyltrimethyl ammonium bromide, dodecyltrimethyl ammonium bromide, hexadecyltrimethyl ammonium bromide, octadecyltrimethyl ammonium bromide; non-ionic surfactants such as linear chain alkyl alcohols, cetyl alcohol, stearyl alcohol and fatty alcohol, poly(ethylene oxide), hydroxyethyl cellulose, block copolymers surfactants such as poly(ethylene glycol)-poly(propylene glycol)-poly(ethylene glycol) (PEG-PPG-PEG), poly(ethylene oxide)-poly(propylene oxide)-poly(ethylene oxide) (PEO-PPO-PEO); zwitterionic surfactants such as phosphatidylcholine, phosphatidylserine, and the like.

When emplaced, emulsified geopolymer precursor compositions may be reacted by destabilizing the surfactant, which initiates mixing between the phases, coalescence of the internal phase, and polymerization of the geopolymer precursor. In one or more embodiments, surfactant destabilization may be triggered by an appropriate stimulus such as temperature for nonionic or zwitterionic surfactants, or pH for ionic surfactants.

Base Fluid

Geopolymer precursor compositions may be aqueous, oleaginous, and oil-in-water or water-in-oil emulsions. In one or more embodiments, base fluids may also include foams and other activated fluids. Base fluids useful for preparing fluid formulations in accordance with the present disclosure may include at least one of fresh water, sea water, brine, mixtures of water and water-soluble organic compounds, and mixtures thereof. In various embodiments, the aqueous fluid may be a brine, which may include seawater, aqueous solutions wherein the salt concentration is less than that of sea water, or aqueous solutions wherein the salt concentration is greater than that of sea water. Salts that may be found in seawater include, but are not limited to, sodium, calcium, aluminum, magnesium, potassium, strontium, and lithium salts of chlorides, bromides, carbonates, iodides, chlorates, bromates, formates, nitrates, oxides, sulfates, silicates, phosphates and fluorides. Salts that may be incorporated in a brine include any one or more of those present in natural seawater or any other organic or inorganic dissolved salts.

Additionally, brines that may be used in the wellbore fluids disclosed herein may be natural or synthetic, with synthetic brines tending to be much simpler in constitution. In one embodiment, the density of the wellbore fluid may be controlled by increasing the salt concentration in the brine (up to saturation, for example). In a particular embodiment, a brine may include halide or carboxylate salts of mono- or divalent cations of metals, such as cesium, potassium, calcium, zinc, and/or sodium.

Other suitable base fluids useful in methods described herein may be oil-in-water emulsions or water-in-oil emulsions in one or more embodiments. Suitable oil-based or oleaginous fluids that may be used to formulate emulsions may include a natural or synthetic oil and in some embodiments the oleaginous fluid may be selected from the group including diesel oil; mineral oil; a synthetic oil, such as hydrogenated and unhydrogenated olefins including polyalpha olefins, linear and branch olefins and the like, polydiorganosiloxanes, siloxanes, or organosiloxanes, esters of fatty acids, specifically straight chain, branched and cyclical alkyl ethers of fatty acids, mixtures thereof and similar compounds known to one of skill in the art; and mixtures thereof.

Filler Materials

Spacer fluids in accordance with the present disclosure may include a number of additives, such as filler materials, that maintain separation between the geopolymer precursor composition stages during emplacement, and later dislodge, dissolve, or otherwise are removed to generate flow channels between pillars produced by the cured geopolymer precursor composition. Filler materials in accordance with the present disclosure may include degradable materials such as homopolymers of lactic acid, glycolic acid, hydroxybutyrate, hydroxyvalerate and epsilon caprolactone; random copolymers of at least two of lactic acid, glycolic acid, hydroxybutyrate, hydroxyvalerate, epsilon caprolactone, L-serine, L-threonine, and L-tyrosine; block copolymers of at least two of polyglycolic acid, polylactic acid, hydroxybutyrate, hydroxyvalerate, epsilon caprolactone, L-serine, L-threonine, and L-tyrosine; homopolymers of ethylenetherephthalate (PET), butylenetherephthalate (PBT) and ethylenenaphthalate (PEN); random copolymers of at least two of ethylenetherephthalate, butylenetherephthalate and ethylenenaphthalate; block copolymers of at least two of ethylenetherephthalate, butylenetherephthalate and ethylenenaphthalate; nylons; starches; and combinations of these. Filler materials in accordance with the present disclosure may also include non-degradable fillers such as silica flour, nanocellulose, montmorillonite, barite, calcium sulfate products, wollastonite, phyllosilicate, carbon black, and the like. In some embodiments, the filler materials may be in the form of fibers that are pumped downhole together with the geopolymer precursor composition to ensure uniform mixing of the liquid. The degradable fibers useful as filler materials can be made of any degradable polylactic acid, polyglycolic acid, copolymers of lactic acid and glycolic acid, nylon, starch fibers, and the like.

Additives

In one or more embodiments, thermoplastic or thermoset monomers, oligomers or pre-polymers in liquid form may be mixed with the geopolymer precursor composition to tune the mechanical properties of the pillars. For example, the addition of a thermoplastic or thermoset may help confine geopolymer fines under compressive stress and decrease brittleness. Polymerizable additives in accordance with the present disclosure may include monomer, oligomer, or pre-polymer solutions of thermoplastics that form solids under downhole condition (with or without the presence of an initiator). Thermoplastics in accordance with the present disclosure include polyolefins such as polyethylene and polypropylene, polystyrene, polystyrene copolymers, acrylic polymers, polyvinyl chloride, polyvinyl acetate, polycarbonate, and the like. Thermosets may be any thermoset pre-polymers in liquid form, which react to form polymers under downhole condition. Thermosets in accordance with the present disclosure include crosslinked acrylic, crosslinked polyesters such as unsaturated polyester resins, epoxy, vinyl esters, and phenolic resin. Thermoplastics and thermosets in accordance with the present disclosure also include copolymers of any of the above types of polymers.

In one or more embodiments, the mechanical properties of geopolymer pillars may be tuned by incorporating additives such as nanoparticles, microparticles, conventional proppants such as sand and ceramic particles, and fibers. Non-limiting examples of the reinforcing nanoparticles or fillers include but are not limited to carbon black, clay nanoparticles, silica, alumina, zinc oxide, magnesium oxide, and calcium oxide. Non-limiting examples of the reinforcing fiber fillers include but is not limited to carbon fiber, glass fibers, polyether-ether-ketone fibers, polymethyl methacrylate fibers, cellulosic fibers, and carbon nanotubes such as single wall carbon nanotube and multiwall nanotubes either with or without functionality.

In one or more embodiments, treatment fluids may include a variety of functional additives to improve fluid properties and to mitigate formation damage. In some embodiments, functional additives may include scale inhibitors, demulsifiers, wettability modifiers, formation stabilizers, paraffin inhibitors, asphaltene inhibitors, and the like. Other functional additives may include oxidizing breakers, corrosion inhibitors, compressed gases, foaming agents, and similar chemicals that improve the performance of the fracturing fluid.

Although only a few examples have been described in detail above, those skilled in the art will readily appreciate that many modifications are possible in the examples without materially departing from this subject disclosure. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112 (f) for any limitations of any of the claims herein, except for those in which the claim expressly uses the words 'means for' together with an associated function.

What is claimed:

1. A method of treating a subterranean formation penetrated by a wellbore, comprising:
    injecting a multistage fracturing treatment into the wellbore comprising one or more stages of geopolymer precursor composition comprising a geopolymer precursor and an activator, and one or more stages of a spacer fluid; and
    curing the one or more stages of geopolymer precursor composition, wherein the curing includes varying at least one of an injection time and a pump speed of the injecting the multistage fracturing treatment into the wellbore.

2. The method of claim 1, further comprising:
    reducing the applied pressure to the wellbore below the fracture pressure.

3. The method of claim 1, wherein at least one of the one or more stages of the spacer fluid comprise a filler material.

4. The method of claim 3, further comprising:
    removing the filler material to create open channels in the one or more intervals of the wellbore.

5. The method of claim 1, wherein the multistage fracturing treatment comprises a foam.

6. The method of claim 1, wherein the ratio of the one or more stages of the geopolymer precursor composition and one or more stages of the spacer fluid is within the range of 1:0.1 to 0.1:1.

7. The method of claim 1, wherein the volume of each of the one or more stages of the geopolymer precursor composition is within the range of from 2 to 10 bbl.

8. The method of claim 1, wherein introducing a multistage treatment fluid into one or more intervals of a wellbore comprises injecting the one or more stages of geopolymer precursor composition and the one or more stages of the spacer fluid in sequence in which each stage is pumped for a duration that may range from 5 to 20 seconds, and at an injection rate that ranges from 5 to 60 bbl/min.

9. The method of claim 1, wherein at least one of the one or more stages of the polymer-forming composition comprises a multiphase composition in which the geopolymer precursor is in a first phase and an activator is in a second phase.

10. The method of claim 1, wherein at least one of the one or more stages of a spacer fluid comprise a fiber additive.

11. The method of claim 1, wherein the geopolymer precursor composition is one or more selected from a group consisting of: metakaolin ($Al_2Si_2O_6$), kaolinite ($Al_2Si_2O_5(OH)_4$), mullite ($Al_6Si_2O_{13}$); feldspar, anorthite ($CaAl_2Si_2O_8$), microcline ($KAlSi_3O_8$), celsian ($BaAl_2Si_2O_8$), labradorite $(Ca,Na)Al(Al, Si)Si_2O_8$, class C fly ash, class F fly ash, and blast furnace slag.

12. The method of claim 1, wherein the activator in the geopolymer precursor composition comprises one or more selected from a group consisting of: sodium hydroxide, potassium hydroxide, calcium hydroxide, sodium silicate, potassium silicate, cerium silicate sodium carbonate, sodium sulfite, sodium phosphate, potassium carbonate, potassium sulfite, sodium sulfate, and potassium sulfate.

13. The method of claim 1, wherein the geopolymer precursor composition further comprises one or more surfactants.

14. A method of treating a subterranean formation penetrated by a wellbore, comprising:
    injecting a multistage fracturing treatment into the wellbore comprising:
    one or more stages of geopolymer precursor composition, wherein the geopolymer precursor composition comprises an emulsion having an oleaginous external phase, and an internal phase comprising one or more surfactants, a geopolymer precursor, and an activator, and one or more stages of a spacer fluid; and
    curing the one or more stages of geopolymer precursor composition, wherein the curing includes varying at least one of an injection time and a pump speed of the injecting the multistage fracturing treatment into the wellbore.

15. The method of claim 14, wherein at least one of the one or more stages of the spacer fluid comprise a filler material.

16. The method of claim 15, further comprising:
    removing the filler material to create open channels in the one or more intervals of the wellbore.

17. The method of claim 14, wherein the multistage fracturing treatment comprises a foam.

18. The method of claim 14, wherein the ratio of the one or more stages of the geopolymer precursor composition and one or more stages of the spacer fluid is within the range of 1:0.1 to 0.1:1.

19. The method of claim 14, wherein the volume of each of the one or more stages of the geopolymer precursor composition is within the range of from 2 to 10 bbl.

20. The method of claim 14, wherein introducing a multistage treatment fluid into one or more intervals of a wellbore comprises:
    injecting the one or more stages of geopolymer precursor composition and the one or more stages of the spacer fluid in sequence in which each stage is pumped for a duration that may range from 5 to 20 seconds, and at an injection rate that ranges from 5 to 60 bbl/min.

* * * * *